M. M. GOLDBERG.
SPEED TRANSFORMER.
APPLICATION FILED NOV. 4, 1915.

1,328,083.

Patented Jan. 13, 1920.

Inventor
Maximilian M. Goldberg
By Harry W. Lindsay Jr.
His Attorney

UNITED STATES PATENT OFFICE.

MAXIMILIAN M. GOLDBERG, OF DAYTON, OHIO.

SPEED-TRANSFORMER.

1,328,083.          Specification of Letters Patent.          Patented Jan. 13, 1920.

Application filed November 4, 1915. Serial No. 59,643.

*To all whom it may concern:*

Be it known that I, MAXIMILIAN M. GOLDBERG, a citizen of the United States, residing at Dayton, in the county of Montgomery and State of Ohio, have invented certain new and useful Improvements in Speed-Transformers, of which I declare the following to be a full, clear and exact description.

This invention relates to a speed transformer, comprising a rotatable armature, a bodily rotatable magnetic field, and speed regulating means.

The principal object of this invention is to provide a speed transformer which, when connected with a constant or approximately constant speed motor, will deliver power like a varying speed motor.

Another object of this invention is to provide means whereby the direction of rotation of the driven member, *i. e.*, the power receiving body, may be reversed without stopping or changing the speed of the driving device, *i. e.*, the constant speed driving motor.

A further object of this invention is to provide means for varying the current supplied to the rotating field so as to modify or vary as desired the torque transmitted through the speed transformer.

Yet another object of this invention is to provide means whereby the action of the speed transformer may be reversed; that is, that part of the transformer which is normally driven at a varying speed is operated at a constant speed and that part which is normally connected to the constant speed driving motor and consequently operated at a constant speed becomes a driven member and runs at a varying speed. Such a case may exist where it is necessary to start a constant speed driving motor having no self starting properties by an auxiliary device and then the constant speed motor becomes a varying speed load. That part of the transformer referred to above as normally operating at a constant speed is the electromagnetic field and the part normally running at a varying speed is the casing or housing which carries a system of planetary gearing and is connected to the load by the clutch device to be referred to more particularly hereinafter. When the transformer of the present invention is operating in reversed order, that is, when the electromagnetic field is rotating at a varying speed, the action of the transformer of the present invention is identical to the action of the speed transformer fully shown and described in the co-pending application for Letters Patent of the United States, Serial No. 39,096, filed July 10, 1915, by Maximilian M. Goldberg and reference may be had thereto for a complete description of the same.

As mentioned above, in the illustrative form of embodiment of the present invention this arrangement with means for reversing the action of the speed transformer is shown in connection with a constant speed motor which has no self starting properties and which operates the transformer after this motor has been started by the auxiliary starting device. As is well known, constant speed motors have (with a very few exceptions) no starting torque and consequently no tendency to start to rotate and for this reason a special auxiliary motor is used in each case for starting purposes and this auxiliary motor must of necessity have a varying speed characteristic, since the starting of the constant speed motor is a varying speed load. With the transformer of the present invention a constant speed motor may be used as the auxiliary starting device.

In the present invention a small shunt generator is used to supply current to the rotating electromagnetic field. It is well known that a shunt generator will run as a shunt motor when supplied with current from a battery or other source of electrical energy. Consequently it is only necessary for starting purposes to connect this generator to the above mentioned casing of the transformer. By connecting the terminals of this generator to the battery the latter will drive the generator as a starting motor which in turn will drive the speed transformer and start the main driving motor which, of course, at this time constitutes a varying speed load. In this connection, it may be mentioned that in the majority of cases where constant speed motors are used, especially on vehicles such as locomotives, automobiles and the like, electric current is necessary for lighting and other purposes and for such purposes the vehicles are provided with generators and batteries. In the present invention the same generator which is used to supply current to the electromagnetic field is used for lighting purposes and also as the starting motor for operating the speed transformer to start the main driving motor and also to charge the battery. To this end the driven member of the speed transformer is disconnected from the power receiver or device to be operated and connected to the starting motor. After the main driving motor has reached its normal speed and becomes the driver the starting motor is automatically coupled to the main driving motor and continues to operate, but now as a shunt generator to supply the necessary current to the electromagnetic field of the transformer, the lighting system and also to charge the battery. By reconnecting the driven member of the speed transformer with the power receiver the latter is operated by the main driving motor through the speed transformer.

With these and incidental objects in view, the invention consists in certain novel features of construction and combinations of parts, the essential elements of which are set forth in appended claims, and a preferred form of embodiment of which is hereinafter described with reference to the drawings which accompany and form a part of this specification.

Having described above the general construction of the present invention and the objects to be accomplished, the specific means shown in the present illustrative form of embodiment for accomplishing these objects will now be described in detail.

A constant speed motor 8 (Fig. 1) is adapted to rotate a shaft 9 suitably supported by three brackets or standards 10. Rigidly mounted on the shaft 9 is an electromagnetic field comprising a core 11 with field windings 12 supplied with current as hereinafter described. This electromagnetic field is mounted within a squirrel cage armature 14 which is loosely mounted on the shaft 9. The armature 14 may be of any well known direct or alternating current type or construction, the squirrel cage armature comprising end disks 15 and 16, conducting bars and laminations 18 being preferred. The disks 15 and 16 are preferably of non-magnetic material and are rigidly connected by a circular casing 13. Rigidly mounted on a hub 19 of the disk 16 (Figs. 1 and 3) of the armature is a pinion 22. Two pinions 23 having equal diameters mesh with the pinion 22 and are rigidly mounted on appropriate shafts 24 journaled at their ends in a casing or housing 25. This casing 25 comprises a hollow cylindrical member 26 and a disk 27 which constitutes one side of the casing and is rigidly connected by pins or screws to internal lugs 28 on the member 26. The member 26 of the casing is loosely mounted on the shaft 9 and the disk 27 is loose on the hub 19 of the disk 16 of the armature. Rigidly mounted on the shaft 9 and adjacent the pinion 22 is a pinion 30 meshing with two pinions 31 also rigidly mounted on the shafts 24.

Splined on the hub 32 of the member 26 of the casing 25 is a clutch disk 33 which may be of any desired construction. This disk 33 is splined on the hub 32 so that it may rotate with the casing 25 and also be shifted on the hub 32 to couple the casing and a bevel gear 34 together. The bevel gear is loosely mounted on the shaft 9 and meshes with a bevel gear 35 fast on a shaft 36 which is connected to the load to be operated at a varying speed. Any desired means may be employed to shift the clutch disk 33 on the hub 32, a lever 38 pivoted at 39 being shown in the preferred form for accomplishing the function. The lever 38 carries a pin 40 (shown in dotted lines in Fig. 1) which projects into an angular groove 41 in the clutch disk 33 so that the latter may be shifted by the lever 38 and also be rotated independently of this lever.

Figures 1, 2, 3, 4, 5:
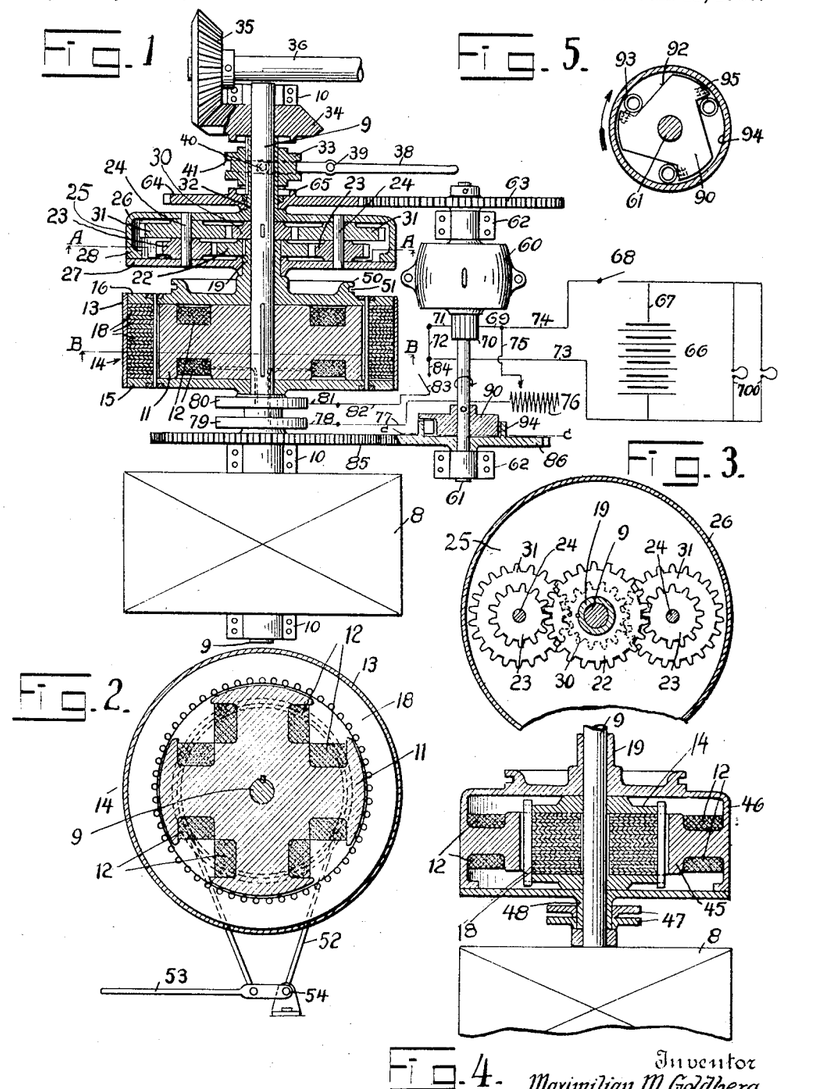
Figure 1 is a top plan view of the present invention showing the speed transformer in horizontal cross section.
Fig. 2 is a detail cross sectional view taken on the line B—B of Fig. 1.
Fig. 3 is a detail cross sectional view taken on the line A—A of Fig. 1.
Fig. 4 is a horizontal cross sectional view showing a modified form of the present invention.
Fig. 5 is a cross sectional view taken on the line C—C of Fig. 1 and shows the clutch device through which the starting motor is driven by the main driving motor.

Let it be assumed that the main driving motor is operating to drive the shaft 9 and the electromagnetic field and that no electric current is supplied to the windings 12 of the electromagnetic field. The rotation of the shaft 9, through the gears 22, 23, 30 and 31, will then rotate the armature in the same direction as the field and at a speed depending upon the proportion of these gears 22, 23, 30 and 31. If the field body is rotating at the constant speed V under these conditions the speed X of the armature will be $$X = \frac{R_1 R_4}{R_2 R_3} V$$

where $R_1$, $R_2$, $R_3$ and $R_4$ represent the radii of the gears 23, 31, 22 and 30 respectively.

Letting
$$\frac{R_1 R_4}{R_2 R_3} = M$$

Then $X = MV$

By making M very near one the speed X of the armature may be very near the speed V of the field, i. e., the relative speed between the field and the armature may be made very small.

When the current is supplied to the field windings 12 electromotive forces, depending upon the relative speed of the field and the armature, will be induced in the closed circuits of the armature and an electric current will flow in said armature circuits. As pointed out more fully in the aforesaid copending application, due to the force exerted by the field upon the current traversed armature conductors a mutual drag will be exerted between the field and the armature and the speed of the latter will change so as to reduce the relative speed between the field and the armature. If the above described system of planetary gearing were not employed and the armature were connected directly to the power receiving shaft 36, the range of speed of the armature would be the same as that of this shaft, i. e., from standstill to its maximum speed. Then the relative speed between the field and the armature would show a very large variation and this would involve high resistance losses in the armature circuits. The use of the above described system of planetary gearing reduces these losses to a negligible quantity, for it reduces the relative speed between the field and the armature to a very small value.

As the speed of the field in the present construction is constant an increase of the speed of the armature due to the currents induced in the armature circuits when current is supplied to the field windings 12 will cause the casing 25 with the shafts 24 to rotate in the same direction as the field regardless of whether M is larger or smaller than one. If now Z is the new speed of the armature and Y the speed of the casing the following relation exists:

$$Z = Y(1-M) + MV$$

which shows that the change in the speed of the power receiving bevel gear 34 is accompanied by but a very small change of speed of the armature.

When M is smaller than one, then with increasing speed of the power receiving bevel gear 34 the speed of the armature increases until its speed reaches the speed of the field.

Then $Z = V$
Then $Z = Y(1-M) + MV = V$
and $Y = V = Z$

In short the field, the armature and the casing or bevel gear 34 will rotate at the same speed V.

This speed is the synchronous speed of the transformer and is similar to the synchronous speed of the system shown in the aforesaid copending application. The above equations are independent of whether the speed of the driving motor is constant or not. In fact a variable or varying speed motor may be used if desired. In case of a variable speed motor the system will have more than one synchronous speed.

The relative speed between the field and the armature is $$V - Z = V(1-M) - Y(1-M)$$

which equation is also similar to the one given in the aforesaid copending application.

Since with decreasing relative speed between the field and the armature the torque between them decreases the characteristic of the system is that of a varying speed motor i. e., the torque increases with the lower speeds and decreases with higher speeds.

It can now be seen that with the above described construction a method is attained for the transformation of a constant speed motor into a varying speed motor, that is while the power delivered at the shaft 9 has constant speed characteristics the power delivered to the shaft 36 has varying speed characteristics. In other words, by the provision of this speed transformer a motor having the so-called series characteristic is obtained.

When M is larger than one, the speed X of the armature will be larger than the constant speed of the field. As soon as current is supplied to the field the action between the field and the armature is such as to decrease their relative speed and since the speed of the field is constant the speed of the armature will decrease. This decrease in the speed of the armature will cause the casing 25 to rotate in the same direction with the field. It can therefore be seen that it makes no difference whether M is smaller or larger than one, as the casing 25 and therefore the power receiving bevel gear 34 will rotate in the same direction as the field and this with varying speed depending upon the varying load. The greater the relative speed between the field and the armature the greater the torque exerted and the slower will be the speed of the casing 25 and the shaft 36; and the smaller the relative speed the smaller the torque and the higher the speed of the casing 25 and the shaft 36. The characteristic of the system is consequently a varying speed characteristic.

The positions of the field and armature shown in the preferred form in Fig. 1 may be reversed, if desired, as illustrated in Fig. 4. In this figure the armature 14 is shown as being rigidly mounted on the shaft 9 driven by the main driving motor 8 and the electromagnetic field is shown as comprising poles 45 and field windings 12 which are carried in a frame 46 loosely mounted on the shaft 9. The pinion 22 is rigidly mounted on the hub 19 on one side of the frame 46, and slip rings 47 through which the current is supplied to the field windings 12 are fast on a hub 48 on the opposite side of the frame 46. With this construction, the armature, being fast on the shaft 9, is driven at a constant speed by the main driving motor 8 and the field is rotated at a variable speed. The speed imparted to the power receiving body, i. e., the bevel gear 34, through the planetary gearing and casing is dependent upon the relative speed between the armature and the field, the above equations being applicable also to this modified construction.

In order to reverse the direction of rotation of the power receiving shaft 36 without reversing the constant speed driving motor 8, it is only necessary when M is smaller than one to apply a brake to the armature and open the circuit through the field windings 12. This brake may be of any desired construction, that shown in the drawings being used for illustration. This brake comprises a circular flange 50 integral with the disk 16 of the armature. A metal ribbon 52 is mounted in a groove 51 formed in the periphery of the flange 50. The ends of the ribbon 52 are connected to a lever 53 pivoted at 54. When the clutch disk 33 is in position to couple the casing 25 and the gear 34 together and the circuit supplying current to the field windings 12 is open the application of the brake decreases the speed of the armature and hence that of the driven shaft 36 until the latter will come to a standstill when the speed of the armature has become $X = MV$. A continued application of the brake will slow down the armature still more and the power receiving shaft will rotate in the reverse direction.

As above stated, the main driving motor 8 has no self-starting properties. In order to start this motor a shunt generator 60 is operated as a motor. This starting motor 60 is adapted to rotate a shaft 61 journaled near its ends in brackets or standards 62. Rigidly mounted on the shaft 61 is a gear 63 meshing with a gear 64 loose on the hub 32 of the member 26 of the casing 25. The gear 64 on one side is provided with clutch projections 65. The clutch disk 33 is so constructed that it may be slid on the hub 32 and into engagement with the projections 65 to couple together the gear 64 and the casing 25. Current is supplied to the starting motor to start the same by a battery 66 or any other suitable source of electric energy. When a switch 68 is closed the battery supplies current to the starting motor 60 the circuit being as follows: from the battery 66 through wire 67, switch 68, wire 74, brush 69 engaging the commutator 70 of the starting motor, through the motor, then through the commutator 70, a brush 71 engaging the commutator, wire 72 and wire 73 back to the battery. The battery 66 may be employed, if desired, to supply current to the lamps 700 of the locomotive, automoblie or other vehicle to which the invention is applied when the vehicle is at standstill.

When it is desired to start the main driving motor 8 the clutch disk 33 is first shifted on the hub 32 to couple the gear 64 and the casing 25 together and then the switch 68 is closed to start the starting motor 60. When the switch 68 is closed the battery 66 supplies current also to the field coils 12, the circuit being as follows: from the battery 66, wire 67, switch 68, wire 74, wire 75, rheostat 76, wire 77, brush 78 engaging a slip ring 79, through the field windings 12, slip ring 80, brush 81 engaging the slip ring 80, wire 82, closed switch 83, wire 84, and wire 73 back to the battery. The slip rings 79 and 80 are fast on the shaft 9. The operation of the starting motor through the gears 63 and 64 and the clutch disk 33 rotates the casing 25 in the same direction as this casing is rotated when the main driving motor 8 is operating the same as above described. The main driving motor at this time, however, constitutes a load. It can be seen that when the casing 25 is rotated in this manner that the shafts 24 revolve and at the same time rotate because of the meshing of the gears 32 and 23 and 30 and 31. Due to the fact that these gears are of different radii, the armature will rotate at a speed depending upon the proportion of the gears. As current is supplied to the field coils 12 at the same time by the battery 66 an electromotive force is induced in the armature conductors and a torque is exerted between the armature and the field in consequence of which the field and shaft 9 begin to rotate and the field is operated at a varying speed by the constant speed motor which, in this case, is the starting motor 60. When the speed transformer is operated in this way by the starting motor 60 the action of the speed transformer is identical to that of the speed transformer shown and described in the aforesaid copending application and for a more detailed description of the same reference may be had thereto.

When the main driving motor 8 reaches its normal speed the clutch disk 33 is slid on the hub 32 of the member 26 of the casing 25 to couple the latter to the bevel gear 34. Then the action of the speed transformer is reversed, i. e., the field is rotated at a constant speed and the casing 25 and hence the power receiving shaft 36 are rotated at a varying speed as above described.

As above stated, in the majority of cases where constant speed driving motors are used, as on vehicles, small shunt generators are used to supply current for lighting purposes. In the present invention the shunt generator 60 is operated as a shunt motor to start the main driving motor as above described, and is operated by the main driving motor after the latter reaches its normal speed to supply current to the lighting system and the field coils 12 and also to charge the battery.

The following desired device is interposed between the main driving motor and the starting motor 60 so that when the main driving motor, which has a somewhat greater speed than the motor 60, is operating the speed transformer it drives the starting motor which then operates as a shunt generator. Rigidly mounted on the shaft 9 is a gear 85 (Fig. 1) which meshes with a gear 86 loose on the shaft 61. When the gear 86 is driven by the main driving motor and as the latter approaches its normal speed a clutch automatically couples the gear 86 and the shaft 61 together so that the starting motor is operated as a generator by the main driving motor. This clutch comprises a disk 90 (Figs. 1 and 5) fast on the shaft 61. The disk 90 has cutaway portions 92 in which are seated rollers 93 adapted to coöperate with the inner periphery of a circular flange 94 on the gear 86. Spring plungers 95 are seated in the disk 90 and coöperate with rollers 93. These plungers 95 tend to force the rollers 93 away from the nearly radial sides of the cutaway portions 92 so that the rollers 93 are retained in engagement with the inner periphery of the flange 94.

From this description it can be seen that when the disk 90 is rotated at a greater speed than the gear 86 that is, while the starting motor 60 is operating as a motor, the rotation of the disk 90 tends to move the rollers 93 toward the nearly radial edges of the cutaway portions 92 so that the rollers do not frictionally connect the disk 90 and the gear 86. When, however, the reverse condition is present, i. e., when the gear 86 is rotated at a greater speed than the disk 90 as the main driving motor 8 approaches its normal speed, the rollers 93 frictionally couple the disk 90 and gear 86 together so that the disk 90, shaft 61 and shaft 9 are operated together. The shunt starting motor 60 is then operated as a shunt generator and supplies current to the field coils 12, and with the switch 68 closed charges the battery 66 and supplies current to the lamps 700.

As shown the action of the clutch intermediate the gear 86 and the shaft 61 depends upon this gear 86 running at a higher speed than shaft 61. In most cases it is not necessary to bring the main driving motor up to its normal speed. As soon as it has reached a certain speed below its normal speed it will speed up by itself to normal speed. In cases, however, where the constant speed driving motor does not possess this property as, for instance, in a case of an alternating current synchronous motor it is necessary to bring this motor up to its normal speed and this would require that the auxiliary shunt motor 60 be run at a higher speed than the main driving motor. This assumes that the gears 63 and 64 are of the same size. In order to render the clutch effective in this case it is only necessary to proportion the gears 85 and 86 so that the gear 86 runs at a higher speed than the gear 85, that is, the gear 86 should be smaller than the gear 85.

Another way of rendering this clutch effective in cases where the main driving motor does not possess the property of speeding up by itself is by changing the field resistance (not shown in the drawings) of the shunt generator 60. As is well known in the art, the speed of a shunt motor can be varied by changing its field current. It is then only necessary to adjust the field resistance so that its normal speed as a motor is higher than its normal speed as a generator. This will also accomplish the desired result without making the ratio of the gears 85 and 86 different from that of the gears 64 and 63.

The rheostat 76 may be employed to vary the current supplied to the coils 12 of the field and thereby vary as desired the torque transmitted through the speed transformer. The switch 83, which is opened when the brake comprising the circular flange 50 and the metal ribbon 52 is applied, may be omitted if desired as the rheostat may be operated to open the circuit if desired.

While the form of mechanism herein described and shown is admirably adapted to fulfil the objects primarily stated, it is to be understood that it is not intended to confine the invention to the one form of embodiment shown and described herein, as it is susceptible of embodiment in various forms all coming within the scope of the claims which follow.

What is claimed is:—

1. In a speed transformer, the combination with a rotatable armature and a bodily rotatable magnetic field adapted to act upon each other so as to reduce their relative speed, of a driven member, means for rotating the field at a constant speed, a gear fast to the armature, a gear fast to the field, a device adapted to be connected to the driven member, and two gears carried by said device and meshing with the gears fast to the armature and the field, the intermeshing gears being of such a ratio that a small change in the speed of the armature effects a large change in the speed of the driven member and the relative speed between the field and the armature is less than that between the field and the driven element except when both relative speeds become zero.

2. In a speed transformer, the combination with a rotatable armature and a bodily rotatable magnetic field adapted to act upon each other so as to reduce their relative speed, of means for directly rotating said field, a member adapted to rotate at a varying speed, a shaft carried by said member, two gears fast on said shaft, a gear fast to the armature and meshing with one of said gears on said shaft, a gear fast to said field and meshing with the other gear on the shaft, the ratio of the intermeshing gears being such that the relative speed between the armature and field is less than that between the field and the member except when both relative speeds become zero.

3. In a speed transformer, the combination with a rotatable armature and a bodily rotatable magnetic field adapted to act upon each other so as to reduce their relative speed, the field being normally rotated at a constant speed as the driving member while the armature is rotated at a varying speed, an element, means interposed between the field, armature and element for automatically maintaining the relative speed between the field and the armature less than that between the field and the element except when both relative speeds become zero and means for reversing the action of the speed transformer so that the element is rotated at a constant speed and the field at a varying speed as the driven member, the relative speed between the field and armature then being less than that between the element and the field except when both relative speeds become zero.

4. In a speed transformer, the combination with two members, i. e., a rotatable armature and a bodily rotatable magnetic field adapted to act upon each other so as to reduce their relative speed, of a driving device for normally operating one of said members at a constant speed, an element, a system of planetary gearing interposed between the two members and the element for automatically maintaining the relative speed between the two members less than that between the member rotated at a constant speed and the element except when both relative speeds become zero, and an auxiliary device for operating said element at a constant speed, the member normally operated at a constant speed then being operated at a varying speed and the relative speed between the field and armature then being less than that between the field and the element except when both relative speeds become zero.

5. In a speed transformer, the combination with a rotatable armature and a bodily rotatable magnetic field adapted to act upon each other so as to reduce their relative speed, of a constant speed motor for normally driving said field at a constant speed, a driven element, means for automatically maintaining the relative speed between the armature and field less than that between the field and the element except when both speeds become zero, and an auxiliary device for operating said means to operate said field at a varying speed and thereby start said motor.

6. In a speed transformer, the combination with a rotatable armature and a bodily rotatable magnetic field adapted to act upon each other so as to reduce their relative speed, of a constant speed driving motor for normally driving said field at a constant speed, a driven element, means for automatically maintaining the relative speed between the armature and field always less than that between the field and the driven element except when both relative speeds become zero, an auxiliary motor for operating said means to operate said field at a varying speed and thereby start said driving motor, and means whereby the driving motor operates the auxiliary motor as a shunt generator to supply current to the field.

7. In a speed transformer, the combination with a rotatable armature and a bodily rotatable magnetic field adapted to act upon each other so as to reduce their relative speed, of a device for normally operating the field as the driver while the armature is rotated due to currents induced in its circuits, a driven element, means interposed between the armature, field and element for automatically maintaining the relative speed between the armature and field normally less than that between the field and the element except when both relative speeds become zero, and mechanism for operating the element as a driver to reverse the action of the transformer so that the field becomes the driven member and the relative speed between the field and armature is less than that between the element and field except when both relative speeds become zero.

8. In a speed transformer, the combination with a rotatable armature and a bodily rotatable magnetic field adapted to act upon each other to reduce their relative speed, of a device for operating said field, the armature being rotated due to currents induced in its circuits, a driven element, means interposed between the field, armature and element for automatically maintaining the relative speed between the field and armature less than that between the field and element except when both relative speeds become zero, and an auxiliary mechanism for operating said means and thereby start the operating device.

9. In a speed transformer, the combination with a rotatable armature and a bodily rotatable magnetic field adapted to act upon each other to reduce their relative speed, of a device for operating said field, the armature being rotated due to currents induced in its circuits, a driven element, planetary gearing interposed between the field, armature and element for automatically maintaining the relative speed between the field and armature less than that between the field and element except when both relative speeds become zero, and an auxiliary mechanism for operating said planetary gearing and thereby start the operating device.

10. In a speed transformer, the combination with two members, i. e., a rotatable armature and a bodily rotatable magnetic field adapted to act upon each other so as to reduce their relative speed, of a driving device for normally driving one of said members at a constant speed while the other member is rotating at a varying speed, an element, a system of planetary gearing intermediate the two members and the element for automatically controlling in accordance to the load the speed of the member rotated at a varying speed, an auxiliary device, and means for connecting and disconnecting said auxiliary device and said system of planetary gearing, the auxiliary device being adapted to drive the member, normally driven at a constant speed, at a varying speed through said system of planetary gearing when the auxiliary device is connected to the system of planetary gearing.

11. In a speed transformer, the combination with two rotating members, that is, a rotatable armature and a bodily rotatable field adapted to act upon each other so as to reduce their relative speed, of a constant speed motor for driving one of said members at a constant speed while the other member is rotating at a varying speed, means operated at a varying speed and adapted to automatically control in accordance to the load the speed of the member rotated at a varying speed, a driven element, a device for connecting said means and said element at will, an auxiliary device for operating said means to start said motor and adapted to be connected at will to said means by said device.

12. In a speed transformer, the combination with a rotatable armature and a bodily rotatable magnetic field adapted to act upon each other so as to reduce their relative speed, of a constant speed driving motor for normally driving said field at a constant speed while the armature is rotating at a varying speed, means for automatically controlling in accordance to the load the speed of the armature, an auxiliary motor for operating said means to operate said field at a varying speed and thereby start said driving motor, and an automatic clutch whereby the driving motor drives said auxiliary motor as a shunt generator to supply current to the field while the driving motor is operating at its normal speed.

13. In a speed transformer, the combination with a rotatable armature and a bodily rotatable magnetic field adapted to act upon each other so as to reduce their relative speed, of a constant speed driving motor for normally driving said field at a constant speed, a system of planetary gearing for automatically controlling in accordance to the load the speed of the armature, an auxiliary motor for operating said system of gearing to operate said field at a varying speed and thereby start said driving motor, and an automatic clutch whereby the driving motor drives the auxiliary motor as a shunt generator to supply current to the field while the driving motor is operating at its normal speed.

14. In a speed transformer, the combination with two members, that is a rotatable armature and a bodily rotatable magnetic field, adapted to act upon each other so as to reduce their relative speed, of a driven element, a prime mover for directly rotating one of said members, a gear fast to each member, a device adapted to be connected to the driven element, and two gears carried by said device and meshing with the gears fast to the armature and field, the ratio of the intermeshing gears being such that the relative speed between the two members is less than that between the driven element and the member directly driven by the prime mover except when both relative speeds become zero, and means for varying the field current as desired to vary the torque transmitted through the transformer.

15. In a speed transformer, the combination with two members i. e., a rotatable armature and a bodily rotatable magnetic field adapted to act upon each other so as to reduce their relative speed, of a driven element, means for rotating one of said members at a constant speed while the other member is rotating at a varying speed, means for automatically controlling in accordance to the load the relative speed between said two members, and means for reducing the speed of the member rotated at a varying speed to reduce or reverse the direction of rotation of the driven element as desired.

16. In a speed transformer, the combination with two members i. e. a rotatable armature and a bodily rotatable magnetic field adapted to act upon each other so as to reduce their relative speed, of a main driving device for normally operating one of said members at a speed synchronous with that of the driving device, an element, means interposed between the field, armature and element for automatically maintaining the relative speed between the field and armature less than that between the member driven at said synchronous speed and the element except when both relative speeds become zero, and means including an auxiliary driving device for reversing the action of the speed transformer so that the element is driven at a speed synchronous with that of the auxiliary driving device the relative speed between the field and armature being less than that between the element and the member normally driven at a speed synchronous with that of the main driving device except when both relative speeds become zero.

17. In a speed transformer the combination with two elements i. e. a rotatable armature and a bodily rotatable field adapted to act on each other so as to reduce their relative speed, of a main driving device for rotating one of said members the other member being rotated due to currents induced in the armature, means intermediate the two members for automatically controlling in accordance to the load the speed of the member rotated due to the induced currents, a driven element, a device for connecting said means and driven element at will, and an auxiliary driving device adapted to be connected by said connecting device to said intermediate means.

18. In a speed transformer the combination with a rotatable armature and a bodily rotatable magnetic field, of a main driving motor for directly driving the field the armature being rotated due to currents induced therein, means for automatically controlling in accordance to the load the speed of the armature, an auxiliary motor for operating said means to start the main driving motor, and means whereby the main driving motor operates the auxiliary motor.

19. In a speed transformer the combination with a rotatable armature and a bodily rotatable magnetic field, of a main driving motor for directly driving the field the armature being rotated due to currents induced therein, means including a system of planetary gearing for automatically controlling in accordance to the load the speed of the armature, an auxiliary motor for operating said means to start the main driving motor, and means whereby the main driving motor operates the auxiliary motor.

20. In combination, a rotatable armature and a bodily rotatable magnetic field adapted to act upon each other so as to reduce their relative speed, a main driving motor, means for automatically controlling in accordance with the load the relative speed between the armature and field when driven by said main operating motor, an auxiliary motor for operating said means to start the main driving motor, and means whereby the main driving motor operates the auxiliary motor.

21. In combination, a rotatable armature and a bodily rotatable magnetic field adapted to act upon each other so as to reduce their relative speed, a main driving motor, means including a system of planetary gearing for automatically controlling in accordance with the load the relative speed between the armature and field when driven by said main operating motor, an auxiliary motor for operating said means to start the main driving motor, and means whereby the main driving motor operates the auxiliary motor.

22. In a speed transformer the combination with two members i. e., a rotatable armature and a bodily rotatble magnetic field adapted to act on each other so as to reduce their relative speed, of a main driving device for normally rotating one of said members the other member being rotated due to currents induced in the armature, and an auxiliary driving device for rotating the last mentioned member to start the main driving device the member normally rotated by the main driving device being then rotated due to currents induced in the armature.

23. In a speed transformer the combination with two members i. e., a rotatable armature and a bodily rotatable magnetic field adapted to act on each other so as to reduce their relative speed, of a main driving device for normally rotating one of said members the other member being rotated due to currents induced in the armature, an auxiliary driving device for rotating the last mentioned member to start the main driving device the member normally rotated by the main driving device being then rotated due to currents induced in the armature, an element adapted to be driven by said main driving device through said armature and field, and means operable at will for connecting said element to be driven and for connecting said auxiliary driven device to start the main driving device.

24. In a speed transformer the combination with two members i. e., a rotatable armature and a bodily rotatable magnetic field adapted to act on each other so as to reduce their relative speed, of a main driving device for normally rotating one of said members the other member being rotated due to currents induced in the armature, an auxiliary driving device for rotating the last mentioned member to start the main driving device the member normally rotated by the main driving device being then rotated due to currents induced in the armature, and means whereby the main driving device is adapted to operate the auxiliary driving device.

25. In a speed transformer the combination with two members i. e., a rotatable armature and a bodily rotatable magnetic field adapted to act on each other so as to reduce their relative speed, of a main driving device for normally rotating one of said members, the other member being rotated due to currents induced in the armature, an auxiliary driving device for rotating the last mentioned member to start the main driving device the member normally rotated by the main driving device being then rotated due to the currents induced in the armature, an element adapted to be driven by said main driving device through said armature and field, means operable at will for rendering said element capable of being driven and for rendering said auxiliary driven device capable of starting the main driving device, and means whereby the main driving device is adapted to operate the auxiliary driving device.

26. In combination, a prime mover, a driven member, change speed mechanism intermediate the prime mover and the driven member, a starting motor for starting said prime mover through said change speed mechanism, and means whereby the prime mover rotates the auxiliary motor independently of the change speed mechanism.

27. In a motor vehicle, the combination of a prime mover for driving the vehicle, a driven member, change speed means intermediate the motor and driven member, a starting motor for starting the prime mover through the change speed means, and a single device for connecting the starting motor or the driven member to said change speed means.

28. In a motor vehicle, the combination of a prime mover for driving the vehicle, a driven member, change speed means intermediate the mover and driven member, a starting motor for starting the prime mover through the change speed means, a single device for connecting the starting motor or the driven member to said change speed means, and means whereby the prime mover operates the starting motor independently of said change speed means.

29. In a speed transformer, the combination with two members, that is a rotatable armature and a bodily rotatable magnetic field, adapted to act upon each other so as to reduce their relative speed, of a driven element, a prime mover for directly rotating one of said members, a gear fast to each member, a device adapted to be connected to the driven element, and two gears carried by said device and meshing with the gears fast to the armature and field, the ratio of the intermeshing gears being such that the relative speed between the two members is less than that between the driven element and the member directly driven by the prime mover except when both relative speeds become zero.

30. In a speed transformer, the combination with members, that is a rotatable armature and a bodily rotatable magnetic field, adapted to act upon each other so as to reduce their relative speed, of a driven element, a prime mover for directly rotating one of said members, a gear fast to each member, a device adapted to be connected to the driven element, two gears carried by said device and meshing with the gears fast to the armature and field, the ratio of the intermeshing gears being such that the relative speed between the two members is less than that between the driven element and the member directly driven by the prime mover except when both relative speeds become zero and an auxiliary mechanism for operating said device and thereby start said prime mover.

31. In a speed transformer, the combination with two members, that is a rotatable armature and a bodily rotatable magnetic field, adapted to act upon each other so as to reduce their relative speed, of a driven element, a prime mover for directly rotating one of said members, a gear fast to each member, a device adapted to be connected to the driven element, two gears carried by said device and meshing with the gears fast to the armature and field, the ratio of the intermeshing gears being such that the relative speed between the two members is less than that between the driven element and the member directly driven by the prime mover except when both relative speeds become zero, means for connecting said driven element and said device at will, and an auxiliary driving motor adapted to be connected by said means to said device.

32. In a speed transformer, the combination with two members, that is a rotatable armature and a bodily rotatable magnetic field adapted to act upon each other so as to reduce their relative speed, of a driven element, a prime mover for directly rotating one of said members, a gear fast to each member, a device adapted to be connected to the driven element, two gears carried by said device and meshing with the gears fast to the armature and field, the ratio of the intermeshing gears being such that the relative speed between the two members is less than that between the driven element and the member directly driven by the prime mover except when both relative speeds become zero, an auxiliary motor for operating said device and thereby start said prime mover, and an automatic clutch whereby said prime mover drives said auxiliary motor as a generator to supply current to the field while the prime mover is operating under its own power.

33. In a speed transformer, the combination with two members, that is a rotatable armature and a bodily rotatable magnetic field, adapted to act upon each other so as to reduce their relative speed, of a driven element, a prime mover for directly rotating one of said members, a gear fast to each member, a device adapted to be connected to the driven element, two gears carried by said device and meshing with the gears fast to the armature and field, the ratio of the intermeshing gears being such that the relative speed between the two members is less than that between the driven element and the member directly driven by the prime mover except when both relative speeds become zero and means for varying the field current as desired to vary the torque transmitted through the transformer.

34. In a speed transformer the combination with two members, that is a rotatable armature and a bodily rotatable magnetic field adapted to act upon each other so as to reduce their relative speed, of a driven element, a prime mover for directly rotating one of said members, a gear fast to each member, a device adapted to be connected to the driven element, two gears carried by said device and meshing with the gears fast to the armature and field the ratio of the intermeshing gears being such that the relative speed between the two members is less than that between the driven element and the member directly rotated by the prime mover except when both relative speeds become zero, and means for reducing the speed of one of said members to reduce the speed of or reverse the direction of rotation of the driven element.

In testimony whereof I affix my signature.

MAXIMILIAN M. GOLDBERG.